United States Patent [19]

Delaney et al.

[11] Patent Number: 4,668,746
[45] Date of Patent: May 26, 1987

[54] INITIATOR AND METHOD FOR POLYMERIZING ETHYLENE AND PREPARING BLOCK COPOLYMERS CONTAINING ETHYLENE

[75] Inventors: Mark S. Delaney; William B. Marshall; James L. Brewbaker, all of Midland, Mich.

[73] Assignee: The Dow Chemical Company, Midland, Mich.

[21] Appl. No.: 831,679

[22] Filed: Feb. 21, 1986

[51] Int. Cl.$^4$ ............................................. C08F 4/48
[52] U.S. Cl. .................................. 526/180; 502/155; 525/250
[58] Field of Search ..................... 526/180; 502/155

[56] References Cited

U.S. PATENT DOCUMENTS

| | | | |
|---|---|---|---|
| 3,321,479 | 5/1967 | Eberhardt | 526/180 |
| 3,644,314 | 2/1972 | Onishi | 526/180 |
| 3,751,384 | 8/1973 | Langer | 502/155 |
| 4,451,576 | 5/1984 | Lohr | 526/180 |

*Primary Examiner*—Paul R. Michl
*Attorney, Agent, or Firm*—Bruce M. Kanuch

[57] ABSTRACT

A complex of an alkyllithium compound and 1,2-dipyrrolidinoethane is useful as an initiator for the polymerization of ethylene and ethylene block copolymers.

19 Claims, No Drawings

INITIATOR AND METHOD FOR POLYMERIZING ETHYLENE AND PREPARING BLOCK COPOLYMERS CONTAINING ETHYLENE

BACKGROUND OF THE INVENTION

The anionic polymerization of various olefins and conjugated diolefins in the presence of certain Li complexes of chelating tertiary diamines has been discussed in the literature. See, for example, the discussions in U.S. Pat. Nos. 3,450,795, 3,451,988; 3,579,492; and 3,567,703 and in Halasa, A. F., Schulz, D. N., Tate, D. P. and Mochel, V. D.; Organolithium Catalysis of Olefin and Diene Polymerization, Advances in Organometallic Chemistry Vol. 18, pages 55-97 (1980); and Polyamine-chelated Alkali Metal Compounds, Advances in Chemistry, Series 130, ACS, Langer, Arthur W., Editor, Page 3-21, 163-176, and 186-200 (1974); and Halasa, A. F., Lohr, D. F., and Hall, J. E.; Anionic Polymerization to High Vinyl Polybutadiene, Journal of Polymer Science, Polymer Chemistry Edition, Vol. 19, 1357-1360 (1981).

In these polymerization processes, the use of specific alkyllithiums in conjunction with chelating tertiary amines are taught to be useful initiators. The present invention concerns the discovery of a new initiator which permits the anionic polymerization of ethylene to proceed with greater efficiency and at a much faster rate than heretofore possible. Also block polymers of ethylene and anionically polymerizable monomers can be prepared.

SUMMARY OF THE INVENTION

The invention comprises the polymerization of ethylene and the block copolymerization of ethylene and other anionically polymerizable monomers.

Ethylene is contacted with a initiator comprising an alkyllithium and 1,2-dipyrrolidinoethane (DIPYE) to form polyethylene at a temperature of from about ambient to about 70° C. The block copolymers are formed in two steps. First, ethylene is polymerized using the initiator to form a "living polymer". The "living polymer" is then contacted with an anionically polymerizable monomer to form a block copolymer. Additional blocks of different anionically polymerizable monomers may then be attached to this copolymer if desired.

DETAILED DESCRIPTION OF THE INVENTION

The initiator may be employed for the homopolymerization of ethylene and for the formation of block copolymers of ethylene and other anionically polymerizable monomers.

Specific examples of anionically polymerizable monomers which may be copolymerized with ethylene include linear alkenyl aromatics, e.g., styrene, α-methylstyrene, vinyl toluene, vinyl naphthalene, dimethylstyrene, t-butyl styrene and the like; straight chain conjugated diolefins such as 1,3-butadiene, isoprene and the like; cyclic conjugated diolefins such as 1,3-cyclohexadiene and the like; caprolactone and caprolactam.

The diolefins which can be employed in the process are aliphatic and cycloaliphatic conjugated diolefins containing 4 to about 12 carbon atoms. Suitable nonlimiting examples include 1,3-butadiene, isoprene, the 2-alkyl-1,3-butadienes, the 2,3-dialkyl-1,3-butadienes, piperylene, 1,3-hexadiene, 2,4-hexadiene, 1,3-cyclohexadiene, 1-phenyl-1,3-butadiene, 2-phenyl-1,3-butadiene, and the like. The process is particularly effective for isoprene and 1,3-butadiene and especially useful with the latter.

The first component of the initiator system of this invention comprises an alkyllithium compound wherein the alkyl group may be a monovalent hydrocarbon radical of 1 to about 10 carbon atoms. Examples of suitable alkyl groups include methyl, ethyl, n-propyl, isopropyl, n-butyl, isobutyl, n-amyl, isoamyl, n-hexyl, n-octyl, n-decyl, and the like.

Preferably, the first component is an alkyllithium wherein the alkyl radical contains from 2 to about 6 carbon atoms. Particularly preferred herein is n-butyllithium.

The second component of the initiator system of this invention comprises 1,2-dipyrrolidinoethane (DIPYE).

In preparing and using initiators according to this invention, all steps should be carried out in the substantial absence of oxygen, water, carbon dioxide or other harmful impurities. This can be readily accomplished by methods well known in the art, e.g., inert atmospheres and the like. Proton donors such as primary and secondary amines, water, mercaptans, and electrophiles such as ketones, aldehydes, etc. are poisonous to the initiator and growing polymer chains. The monomers and diluent should not contain interferring amounts of these materials. Less than 1 ppm of these materials is preferred. Preferably all materials are purified, e.g., by drying, distillation, deoxygenation, etc. prior to their use.

In practicing one embodiment of this invention, it is generally desirable to prepare the initiator system by mixing the selected alkyllithium with DIPYE. Generally, the molar ratio of the alkyllithium to DIPYE is about 0.1:1 to about 10:1, preferably about 0.5:1 to about 2:1.

As a matter of convenience, it is generally preferred to mix the initiator components in the presence of an inert organic diluent. The diluent, which can also serve as the polymerization medium, should be a liquid at the operating conditions of the polymerization reaction. The diluent should be a saturated aliphatic or saturated cycloaliphatic hydrocarbon having 4 to about 20 carbon atoms such as pentane, isopentane, hexane, heptane, isooctane, cyclopentane, cyclohexane, cyclooctane, decahydronaphthalene, decane, hexadecane, and the like.

In preparing the initiator, sufficient amounts of the diluent are preferably employed such that the concentration of the initiator is normally in the range of about 0.012 to about 0.065 moles/l., preferably about 0.018 to about 0.030 moles/l, based on the diluent. The temperature required for the initiator preparation is not critical. The initiator can be prepared at temperatures ranging from about ambient to about 80° C., preferably about ambient to about 60° C. At higher temperatures the initiator decomposes. Since the initiator components, after mixing, normally result in a liquid mixture, the initiator can be conveniently prepared at atmospheric pressure. If desired, the initiator components can be mixed in situ, i.e., by placing each separate component in the polymerization reactor which preferably contains a diluent of the type described above, adding the selected monomer and allowing the initiator components to be admixed as the polymerization or copolymerization reaction proceeds.

The homopolymerization of ethylene and the polymerization of block copolymers is carried out at a temperature ranging from about ambient to about 70° C. and a pressure ranging from about atmospheric to about 200 psi.

In practicing one embodiment of this invention, the initiator is placed in a polymerization reactor containing one of the above mentioned diluents and ethylene is introduced into the reactor. High ethylene concentrations are preferred. The polymerization reaction is then carried out at a temperature of about ambient to about 70° C., preferably from about 50° to about 60° C. The reaction is allowed to proceed for a sufficient period of time to prepare polyethylene of a desired molecular weight.

It is desired for good operability to limit the concentration of polymer in the diluent to less than about 20 weight percent. Handling of higher concentrations becomes difficult. If necessary, the polymer concentration may be maintained at or below this level by the addition of more diluent during the polymerization reaction.

At the end of the reaction, solid polymer can be isolated from the reaction slurry by mixing with about 3 to about 10 volumes of a $C_1$ to $C_4$ alcohol such as methyl alcohol, isopropyl alcohol, n-butyl alcohol, and the like. The solid product is then filtered and washed with more alcohol and may then be finished by the addition of suitable stabilizers and inhibitors followed by drying according to methods well known in the polymer field. If desired, the product may be extracted with acids, bases, complexing agents, etc. in order to reduce catalyst residues to a low level prior to the addition of stabilizers or inhibitors.

The polymerization reaction may, of course, also be carried out as a continuous operation in which case the initiator components, preferably mixed with sufficient diluent, may be continuously added to the reactor either separately or as a previously combined mixture. Separate streams of additional diluent may be continuously added so as to maintain a suitable polymer concentration in the diluent, achieve desirable monomer conversion, and obtain a high initiator efficiency, i.e., in the range of 10 to 20 grams polymer per gram initiator.

To form the diblock copolymers standard techniques known in the art are followed employing the initiator and other parameters taught for homopolymerization of polyethylene. In the practice of the present invention, however, the ethylene is first polymerized under the condition set forth hereinbefore to a preselected molecular weight then a second monomer is added and the polymerization continued until a diblock polymer of suitable molecular weight is obtained. The techniques employed are those common to anionic living polymerization sequential addition processes which permit the preparation of blocks that have controllable molecular weights.

Block length is dependent on monomer/initiator ratio which can be controlled within preselected ranges.

Synthesis of 1,2-Dipyrrolidinoethane

A 500 ml round bottom flask equipped with a magnetic stirrer and condenser with nitrogen inlet was charged with 67.22 g (0.945 mol) of pyrrolidine, 44.39 g (0.236 mol) of 1,2-dibromoethane, 200 ml of toluene and 75 ml of 2-propanol. The resulting solution was refluxed under nitrogen for 120 hours and allowed to cool. The organic mixture was extracted with water and the organic portion was saved. The water was treated with aqueous NaOH until basic and extracted with ether. The ether and the organic portion were combined and dried over anhydrous magnesium sulfate. The dried solution was filtered and the solvent and any unreacted pyrrolidine was removed by vacuum on a rotary evaporator at 60°-80° C. and 5-10 mm Hg. The residue gave a crude yield of 27.48 g. This residue was distilled at 40 mm Hg at a temperature of 136°-137° C. to yield 22.72 g, 57 percent of DIPYE.

EXAMPLE 1

A 1-liter stirred autoclave with hardwired temperature controller was well pruged with nitrogen and charged with 350 ml of dry cyclohexane. The autoclave was heated to 60° C., then charged with 1.68 g (10 mmol) of 1,2-dipyrrolidinoethane and 5.56 ml of a cyclohexane solution 1.8M in butyllithium (10 mmol). The solution was stirred in the autoclave one minute, then the autoclave was pressurized to 100 psig of ethylene. The ethylene pressure was maintained at 100 psig for 20 minutes to 4 hours. At the end of the run, the ethylene was vented from the autoclave. The autoclave contained long chain living polyethylene which could be reacted with various reactants or could be neutralized with an alcohol such as 2-propanol to recover solid polyethylene.

EXAMPLE 2

A 1-liter Parr autoclave equipped with stirrer, shot tank, sampling valve, bottom dump valve and heater with hardwired controller was used. The autoclave was attached to a gas manifold through which vacuum, argon, nitrogen and ethylene could be introduced. The autoclave was rinsed prior to each use with 800 ml of 0.045M n-butyllithium in cyclohexane which was then drained through the bottom dump valve under nitrogen. The autoclave was then charged with 350 ml of dry cyclohexane via cannula under nitrogen or argon. The cyclohexane had been passed down an activated alumina column and had nitrogen bubbled through it for 15 minutes. The cyclohexane solution was heated to 60° C. under argon and 10 mmol of DIPYE was added via syringe through the sampling valve. Then 10 mmol of n-butyllithium was added via syringe through the sampling valve. Ethylene at 100 psig was then introduced. When a sample of reaction product was desired, the autoclave was vented and a sample taken by syringe through the sampling valve and the autoclave repressurized to 100 psig of ethylene. The sample (7 ml) was added to about 7 ml of 50/50 cyclohexane 2-propanol mixture. Such samples were later used for molecular weight analyses. At the end of each experiment, the autoclave was vented, the remaining solution treated with an excess of 2-propanol, the autoclave disassembled, the polyethylene scraped into a baking pan and any remaining solvent was also put into the pan. The pan was put into an air oven for 8 hours at 90° C. The pan was then removed and the yield of polyethylene determined.

Samples were taken at various times and analyzed by gel permeation chromatography. Their molecular weights and molecular weight distributions are set forth in Table I.

TABLE I

| Time (min.) | $Mn^1$ | $Mw^2$ | Peak $MW^3$ | $Mw/Mn^4$ |
|---|---|---|---|---|
| 5 | 1380 | 2030 | 1780 | 1.47 |
| 15 | 1640 | 2280 | 1880 | 1.39 |

TABLE I-continued

| Time (min.) | Mn[1] | Mw[2] | Peak MW[3] | Mw/Mn[4] |
|---|---|---|---|---|
| 45 | 2220 | 3740 | 2940 | 1.69 |
| 60 | 2460 | 4220 | 3270 | 1.71 |
| 115 | 3290 | 6120 | 5150 | 1.86 |
| 240 | 4000 | 8190 | 6830 | 2.05 |

[1] Mn-number average molecular weight
[2] Mw-weight average molecular weight
[3] Peak Mw-
[4] Mw/Mn-indicative of molecular weight distribution The process yielded 58.35 grams of polyethylene after four hours. The yield is considerably better than that achieved with other Li chelating tertiary diamine initiators.

Infrared analysis of the product showed that the polyethylene had a vinyl content of about 0.18 vinyl groups per 1000CH$_2$ groups. This is related to how much β-hydride termination occurred during the preparation of the polymer.

EXAMPLE 3

A styrene-ethylene block copolymer was prepared as follows. The equipment described in Example 2 was employed. The autoclave was attached to a gas manifold through which vacuum, argon, nitrogen or ethylene could be admitted. The autoclave was also equipped with a 75-ml shot tank and a valved system. The equipment also included a temperature recorder. The autoclave was first thoroughly cleaned by filling it with about 800 ml of cyclohexane and 10 ml of 1.8N n-butyllithium solution in cyclohexane. This mixture was stirred for one hour and allowed to stand overnight. The contents of the autoclave was drained into a xylene-isopropanol mixture. The autoclave was then placed under argon and 350 ml of cyclohexane (dried by passage through alumina and deoxygenated with N$_2$) was added via cannula. The autoclave was heated to 60° C. under argon. DIPYE, 0.86 g (5.1 mmol), was added by syringe through the valved system, followed by approximately 2.8 ml of 1.7N n-butyl lithium solution (4.9 mmol). Ethylene (100 psig) was immediately added and the mixture stirred at 60° C. for thirty minutes. The excess ethylene was vented. Then 32.08 grams of styrene was blown into the autoclave through the shot tank using about 30 psi of argon. There was a slight heat kick recorded on the temperature recorder. The reaction mixture was stirred for about 32 minutes at 60° C. About 10 ml of isopropanol was added to the system to terminate the polymer and the reaction mass stirred for about 5 minutes. The product was then recovered from the autoclave and treated as follows. The reaction mass consisted of a milky white liquid with no visible solid particles. The liquid was poured into a Pyrex baking dish and most of the cyclohexane was evaporated in a hot air oven at 75° C. The solution tended to skin over during the solvent removal. A white solid, (51.42 grams), was recovered which still smelled of cyclohexane. The solid was dissolved in 250 ml of methylene chloride to produce a milky white fluid. The block copolymer was precipitated by slowly dropping the liquid into 1400 ml of methanol in a Waring blender. A fine white solid was formed. It was separated and washed with a fresh portion of methanol (stirred for about 30 minutes), filtered and dried in a vacuum oven for 2 hours at 75° C. Eleven weight percent of polyethylene homopolymer was extracted from a small sample of the white powder by n-octane at 125° C. The remaining diblock copolymer was shown to contain polyethylene segments by infrared spectroscopy.

What is claimed is:

1. A process for polymerizing ethylene which comprises contacting ethylene at a temperature of from about ambient to about 70° C. with a polymerization initiator comprising a complex of an alkyllithium compound with 1,2-dipyrrolidinoethane and recovering the polymerization product.

2. The process of claim 1 including the presence of an inert liquid organic diluent.

3. The process of claim 2, wherein the alkyllithium compound is n-butyllithium.

4. The process of claim 1, wherein the alkyllithium compound is n-butyllithium.

5. The process of claim 2, wherein the alkyllithium compound is n-butyllithium, the diluent is a C$_4$ to about C$_{16}$ liquid alkane or cycloalkane and the reaction temperature ranges from about 50° to about 60° C.

6. The process of claim 1, wherein the molar ratio of alkyllithium compound to DIPYE ranges from about 0.1:1 to about 10:1.

7. The process of claim 2, wherein the molar ratio of alkyllithium compound to DIPYE ranges from about 0.5:1 to about 2:1.

8. A process for preparing polyethylene which comprises: reacting ethylene in the presence of a diluent which comprises a C$_4$ to about C$_{16}$ liquid alkane or cycloalkane and an initiator comprising a complex of an alkyllithium compound, wherein the alkyl radical contains from 2 to 6 carbon atoms, and DIPYE wherein the molar ratio of the alkyllithium compound to DIPYE ranges from about 0.1:1 to about 10:1, at a temperature ranging from ambient to about 70° C. and a pressure of from about atmospheric and up to about 200 psi for a sufficient period of time to form polyethylene and recovering the polyethylene.

9. The process of claim 8, wherein the alkyllithium compound is a compound wherein the alkyl radical contains 1 to about 10 carbon atoms.

10. The process of claim 9, wherein the alkyl radical contains from about 2 to about 6 carbon atoms.

11. The process of claim 8, wherein the alkyl radical is n-butyl.

12. A process for preparing diblock copolymers which comprises:
(a) contacting ethylene at a temperature of from about ambient to about 70° C. and a pressure ranging from about atmospheric to about 200 psi with a polymerization initiator comprising a complex of an alkyllithium compound with 1,2-dipyrrolidinoethane in an inert organic diluent to form a living polyethylene;
(b) adding to the reaction mass formed in (a) a second monomer selected from the group consisting of a linear alkenyl aromatic, a straight chain conjugated diolefin, a cyclic conjugated diolefin, caprolactone and caprolactam;
(c) continuing the polymerization to form a diblock copolymer of polyethylene and the second monomer; and
(d) recovering the polymer.

13. The process of claim 12, wherein the alkyllithium compound is n-butyllithium.

14. The process of claim 12, wherein the alkyllithium compound is a C$_1$ to about C$_{10}$ alkyllithium.

15. The process of claim 12 the alkyllithium compound is a C$_2$ to about C$_6$ alkyllithium.

16. The process of claim 12, 13, 14 or 15, wherein the molar ratio of the alkyllithium compound to 1,2-dipyrrolidinoethane ranges from about 0.1:1 to about 10:1.

17. The process of claim 12, wherein the inert organic diluent is a $C_4$ to about $C_{16}$ liquid alkane or cycloalkane and the initiator is present in the range of about 0.012 to about 0.065 moles per liter of diluent.

18. The process of claim 12, wherein the second monomer is styrene.

19. The process of claim 12, wherein the second monomer is a conjugated diolefin.

* * * * *